Dec. 8, 1925.  G. W. GRISDALE  1,564,558
RECORDING INSTRUMENT
Filed Aug. 13, 1923  3 Sheets-Sheet 1

INVENTOR
George W. Grisdale.
BY Robert M. Bau
ATTORNEY

Dec. 8, 1925.   G. W. GRISDALE   1,564,558
RECORDING INSTRUMENT
Filed Aug. 13, 1923   3 Sheets-Sheet 2
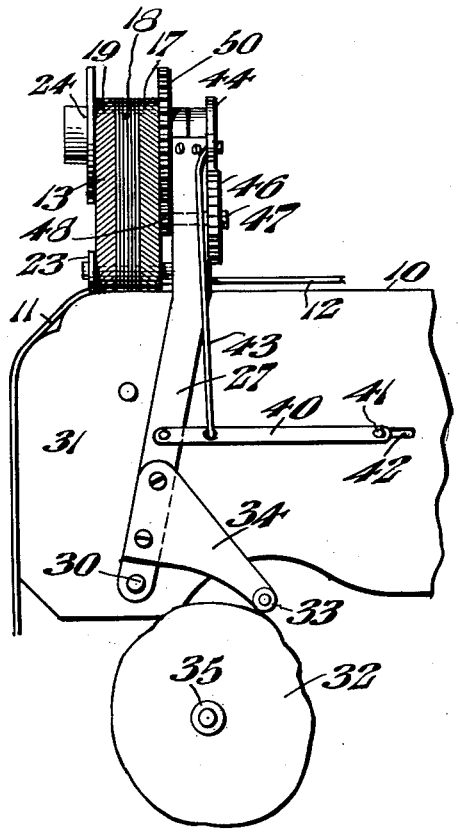
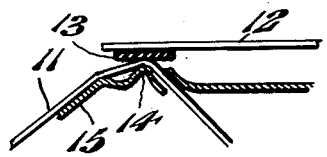
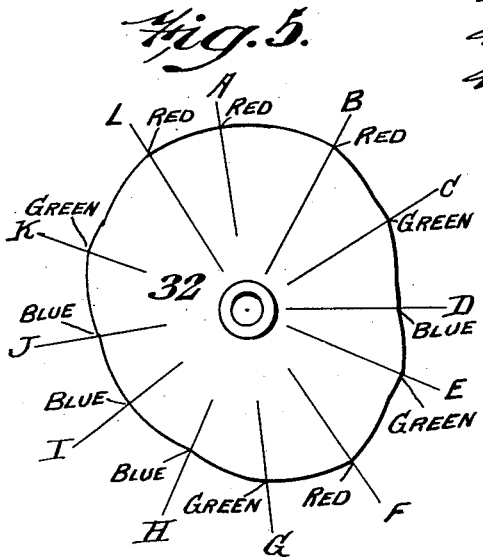
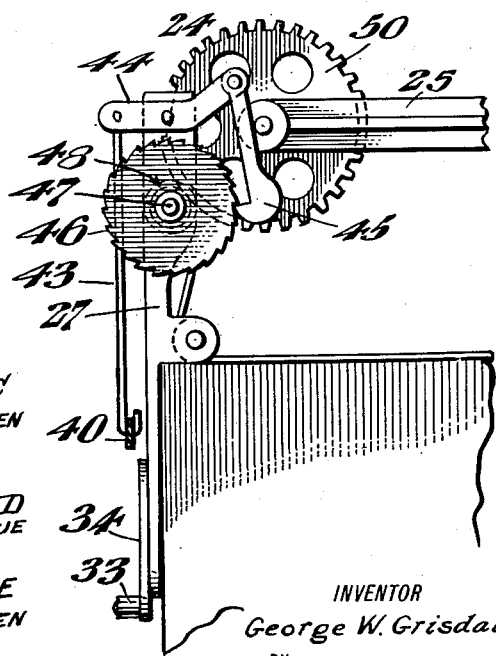
INVENTOR
George W. Grisdale.
BY
Robert M. Barr
ATTORNEY Dec. 8, 1925.  1,564,558
G. W. GRISDALE
RECORDING INSTRUMENT
Filed Aug. 13, 1923    3 Sheets-Sheet 3
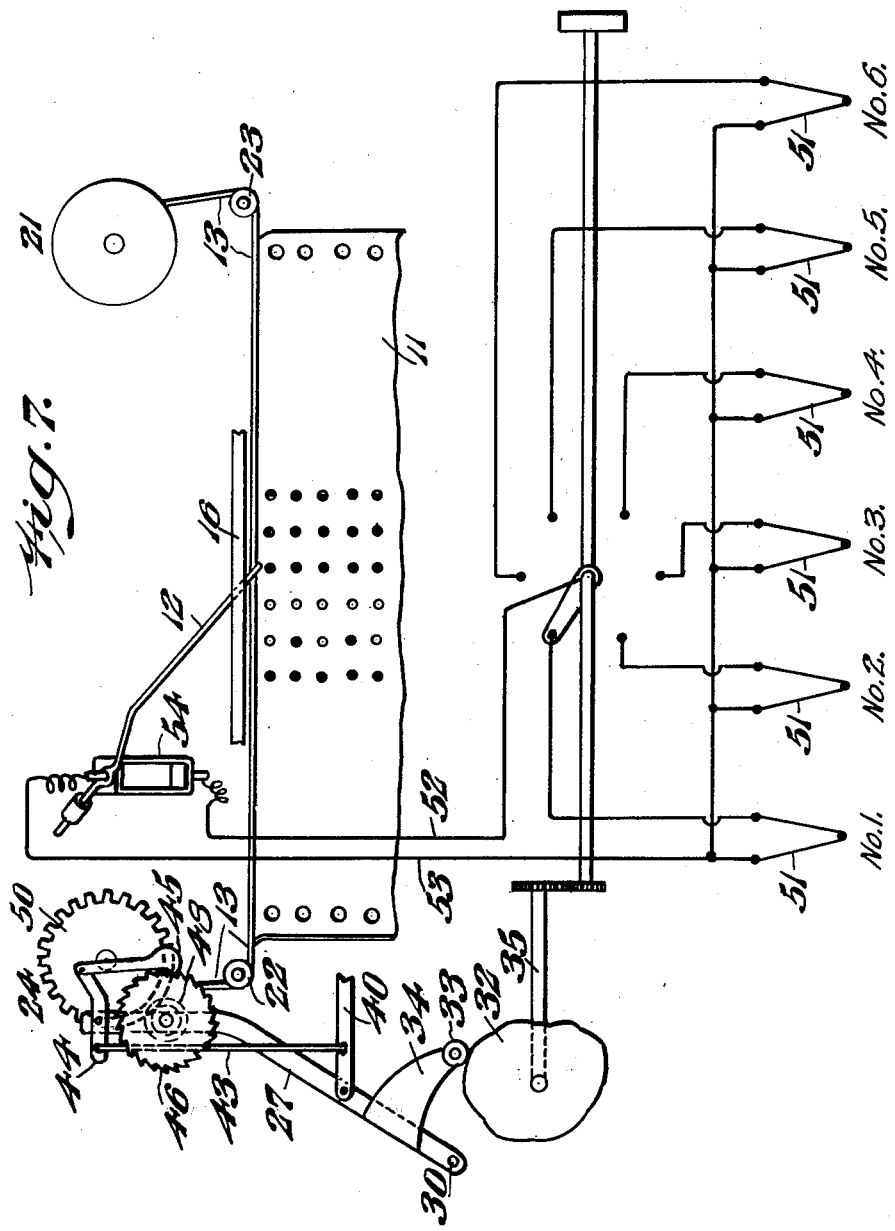
INVENTOR
George W. Grisdale.
BY
Robert M. Barr
ATTORNEY Patented Dec. 8, 1925.

1,564,558

UNITED STATES PATENT OFFICE.

GEORGE W. GRISDALE, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

RECORDING INSTRUMENT.

Application filed August 13, 1923. Serial No. 657,245.

*To all whom it may concern:*

Be it known that I, GEORGE W. GRISDALE, a citizen of the United States, and a resident of Philadelphia, county of Philadelphia, State of Pennsylvania, have invented a certain new and useful Improvement in Recording Instruments, of which the following is a specification.

Some of the objects of the present invention are to provide an improved instrument for separately recording a number of conditions at different locations as transmitted to the instrument by devices respectively responsive to said conditions and providing means for identifying the record of each device with the particular device making the record; to provide means for identifying the record of a thermocouple or other device from other records made on the same chart by other devices; to provide an improved color identification means for recording instruments which are arranged to operate in conjunction with more than one condition transmitting device; to provide in a recording instrument a ribbon having a plurality of different colored sections, and means for recording on a chart, through the medium of the ribbon, characteristics separately identifying a plurality of devices connected to the recording instrument; to provide an identifying device for a recording instrument whereby a combination of colors forms a predetermined record for a particular device connected to the recording instrument; and to provide other improvements as will hereinafter appear.

Figure 1:
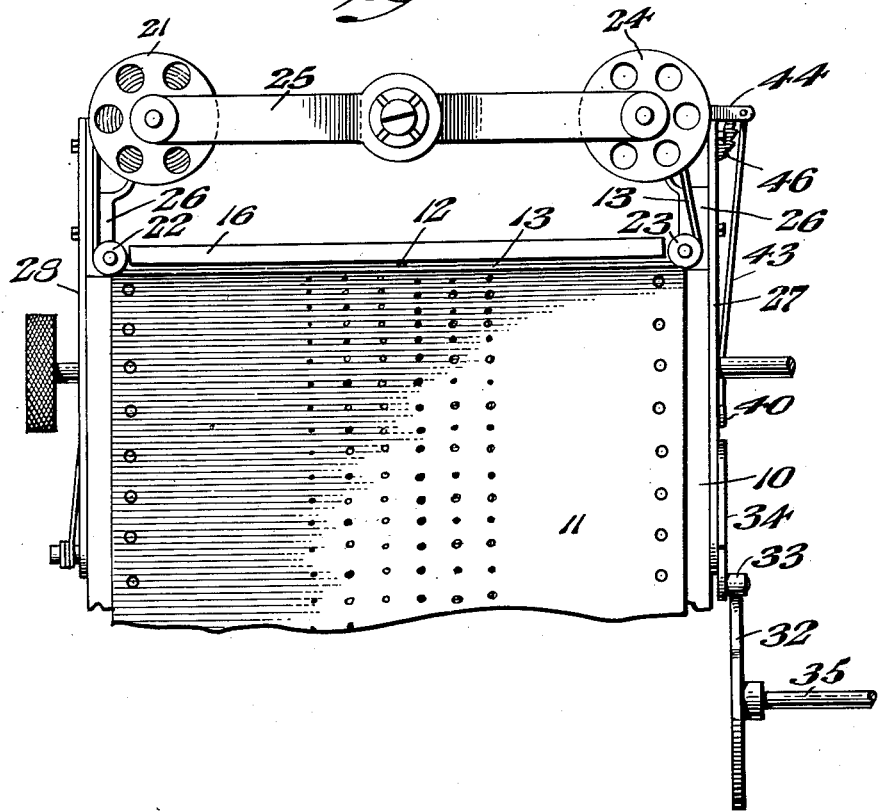
Figure 2:
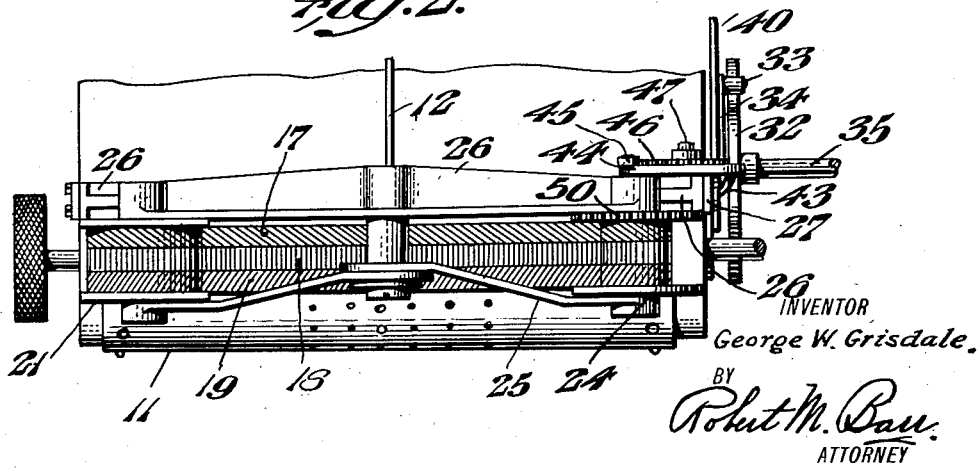

In the accompanying drawings, Fig. 1 represents a front elevation of a portion of a recording instrument showing one form of the present invention; Fig. 2 represents a plan of the same; Fig. 3 represents an elevation of one side of the mechanism shown in Fig. 1; Fig. 4 represents a detail in transverse section of the recording elements; Fig. 5 represents a detail in side elevation of one form of actuating cam employed for recording the movements of the recording mechanism; Fig. 6 represents a rear elevation of a portion of the mechanism shown in Fig. 1 and disclosing in detail one form of ribbon feeding mechanism; and Fig. 7 is a graphic representation of a recording system embodying the present invention.

Referring to the drawings, those portions of an electrical recording instrument are shown which relate to the production of a record of an instrument reading for a device which is connected to the instrument, and in this particular instance the instrument is of the multiple recording type, which is arranged to be connected to more than one device whose temperature or other condition is to be the subject of a record, all of the recorded conditions being made upon the same chart or record paper. The recording instrument selected by way of example and to which the present invention is applied has a bed 10, over which the chart 11 is arranged to be fed in any well known manner, while the record of the reading of the instrument is made upon the chart 11 by impact of a pointer 12 upon a suitable colored ribbon 13, which travels in close proximity to the face of the chart 11 and in alinement with a transversely disposed straight edge 14 formed in a plate 15, extending substantially parallel to and beneath the chart 11. It will be understood that the pointer 12 is the indicating member of an electrical instrument which is operated in the ordinary manner by current transmitted to the instrument, while the impact or impression means for causing the pointer 12 to make the desired dot or other indication upon the chart takes place through the action of a depressor bar 16, which is periodically operated in a manner well known in the art to strike the pointer 12.

In multiple recording instruments it is customary to associate with the recording instrument a number of other devices responsive to variations in a condition, each of which is located at a place where it is subject to the condition existing at that particular place. For example, it may be desirable to record the respective temperatures in a plurality of furnaces, and in such a case each furnace will be provided with a thermocouple and provision made for connecting each thermocouple with the recording instrument, this connection being generally made by a switching mechanism so constructed and arranged as to successively connect the thermocouples with the recording instrument for a predetermined period of time, which period of time being that required to properly influence the electrical instrument of the recording mechanism and obtain the proper record of the temperature. It will be evident that where a number of thermocouples or other quantity measuring devices are connected to the same recording instrument it is extremely desirable to be able to identify the respective recorded indications of the chart with the respective thermocouples. This has heretofore been accomplished by providing a plurality of type bars, each of which has a number or a symbol corresponding to the thermocouple which is designed to operate it, or by providing separate colored filaments, each of a color designating a separate thermocouple or other connecting device. All such prior devices have been complicated and more or less impractical on account of the number of parts required to give the intended result, only a limited number of separate records can be made, and the instruments as a whole have been large, cumbersome and exceedingly difficult to keep in order and preserve the proper sequence of operation.

For the purpose of making a plurality of records of a plurality of different devices connected to the same instrument the present invention contemplates the elimination of all complicated and delicate mechanisms by the provision of a means for identifying the recorded indications, whereby a certain number of recording devices are made to serve for at least double the number of devices which are to be used with the recording instrument. Thus, in the form of the invention here disclosed, the impression ribbon 13 is subdivided throughout its length into three different color divisions 17, 18 and 19, and the arrangement is such, as will be hereinafter pointed out, as to obtain recorded color combinations sufficient for the identification of six separate and distinct devices which are to be connected to the recording instrument one at a time. As here shown, the multi-color ribbon 13 is wound upon a feed spool 21, from which it passes about guide rolls 22 and 23, to locate it accurately in close proximity to and parallel to the surface of the chart, and thence to a re-roll spool 24, these spools 21 and 24 being rotatably mounted at opposite ends of a cage 25, which is fast to a movable carriage 26.

In order to locate the carriage 26 with respect to the straight edge 14, so that each color in turn may assume a recording position with respect to the said straight edge, the opposite ends of the carriage 26 are respectively supported by rock levers 27 and 28, which are pivoted respectively at 30 to the frame 31 of the instrument. The contour of these levers 27 and 28 and the location of the pivoted points 30 with respect to the ribbon and the straight edge 14 are such as to require but a limited movement of the levers in order to change the relation between the straight edge 14 and any one of the colors of the ribbon 13. In the present instance the carriage 26 and the levers 27 and 28 are arranged to be actuated by means of a cam 32, which engages a roller 33, rotatably mounted in an arm 34, and the rotary movement of the cam is such as to raise and lower the arm 34 and consequently shift the carriage from one position to vary the relative position of the ribbon subdivisions with respect to the straight edge 14.

For causing the carriage 26 and its ribbon 13 to be shifted in a predetermined manner, the cam 32, in the present construction, is formed with twelve controlling points or dwells, alphabetically designated on Fig. 5 of the drawing, each of which, in its relation to the roller 33, corresponds to a predetermined position of a colored section of the ribbon 13. It may here be stated that the ribbon 13 in the present example has red, green and blue subdivisions 17, 18 and 19, respectively, and hence one of these colors will be brought into alined relation with the straight edge 14 each time the corresponding dwell on the cam 32 is in engagement with the roller 33. In the present selected color designation for the respective thermocouples, or other devices with which the multiple recorder is associated, the dwells A, B, F and L control the red section of the ribbon 13; the dwells C, E, G and K the green section of the ribbon 13; and the remaining dwells D, H, I and J the blue section of the ribbon 13, and hence, by providing a suitable mechanism for rotating the cam 32 in the required manner the carriage 26 may be so shifted as to cause a predetermined location of the color strips with respect to the straight edge 14. As here shown, the cam 32 is fixed for rotation with a shaft 35 and a suitable periodic gearing (not shown) is provided for giving a step by step movement to the cam 32. This periodic actuation of the shaft 35 has a definite relation to the connection of the respective thermocouples or other devices used with recording instruments, and in the preferred form of the invention this relation is a two to one ratio, and accordingly there are two dwells or points on the cam corresponding to each thermocouple or other connecting device. Thus, since there are in the present illustration six thermocouples to be connected successively to the recording instrument by the switching mechanism, the two dwells of each pair of dwells employed for identifying the respective thermocouples are spaced 180 degrees apart. It is here believed to be unnecessary to illustrate any particular switching mechanism for connecting the thermocouples to the recording instrument or any particular means for causing the recording mechanism to function while any particular device or thermocouple is connected to the recording instrument, because a means for so doing is shown, for example, in the patent to Brown, No. 1,422,920, of July 18, 1922, and therefore this construction is graphically indicated in Fig. 7. From the foregoing, and by reference to Figs. 5 and 7 of the drawings, it will therefore be evident that for example when thermocouple No. 1 is connected to the recording instrument the cam 32 will be in position to bring the dwell A into engagement with the roller 33 to shift the carriage, and so locate the red strip in correct alinement with the straight edge 14, and consequently the action of the depressor bar will cause a red dot or other indication to be made upon the chart 11. The periodic timing of the control mechanism is such that as soon as this indication is made the switching mechanism again functions to connect thermocouple No. 2 to the recorder, and the cam is accordingly shifted one-twelfth of a revolution to bring the dwell B into engagement with the roller 33 to again shift the carriage provided it is necessary to produce a different colored indication upon the chart. In this instance, it happens that the dwell B makes no shift of the carriage because it is desired to make another red indication upon the chart as a part of the indicating record for thermocouple No. 2. In this way, the succession of thermocouples is connected to the recorder, and with each connection the cam 32 shifts through a partial revolution to bring the next dwell into engagement with the cam, and when the cam is moved through 180 degrees from its original position, the dwell G, diametrically opposite to the dwell A, engages the roller 33 so that the second color characteristic for thermocouple No. 1 is recorded upon the chart 11. In this instance the color record for thermocouple No. 1 is red-green. From this it will be seen that there are two control dwells for each thermocouple, and these are located at diametrically opposite points on the cam and from Fig. 5 the arrangement is such that thermocouple No. 2 is identified by a succession of alternate red and blue dots; thermocouple No. 3 by a succession of green and blue dots; thermocouple No. 4 by a succession of blue dots; thermocouple No. 5 by a succession of green dots; and thermocouple No. 6 by a succession of red dots. It will thus be evident that a construction has been provided wherein a plurality of thermocouples or other devices can be employed with the same recording instrument and identification of the respective devices made possible by a less number of colored recording strips than there are devices to be connected to the recording instrument. It will be observed that as the cam is rotated and record impressions are successively made as the cam stages or dwells, A, B, C, etc., pass the roll 33, recurring series or successive similar groups of record impressions are formed. Each individual series or group thus recurring consists of twelve record impressions corresponding to the cam stages or dwells A to L inclusive. In general, each such group or individual series will include at least two record impressions of one color, with the record impressions immediately following respectively, the first mentioned two impressions differing in color from one another. Thus with the mechanism illustrated, one red record is followed by another red record, and two red records are each followed by a green record. Furthermore, the fourth red record (dwell L) is followed by the initial red record of the succeeding series or group of record impressions. Of the four green records, two are followed by blue records, and two are followed by red records, and of the four blue records, two are followed by green records and two by red records. In consequence of this, the apparatus may be used to produce individual records, one for each color of the transfer medium and other records which are composed of combinations of the different colors of the transfer medium.

It will be apparent also from what has already been said that each recurring series may be regarded as forming a plurality of successive sections each comprising one record impression for each record formed, and that the record impressions in successive sections forming part of the same record are similar in color in the case of some of the records formed, and in the case of other records differ in color from one another.

Thus with the apparatus shown, the twelve record impressions forming one series are each composed of two sections, one corresponding to the cam dwells A to F, and the other to the cam dwells G to L. In the case of the six records produced, the three which include the record impressions corresponding to the cam dwells D, E, and F of the first section of impressions each includes a similarly colored impression in the second section of impressions, corresponding to cam dwells J, K, and L respectively; while the other three records each consists of an impression of one color corresponding to a cam dwell A, B, or C from the first section of each recurring series, and a differently colored impression corresponding to cam dwell G, H, or I respectively, from the second section of the series.

As a means for causing the recording ribbon to be fed across the chart 11, so that fresh or unused portions are being continually brought into position for use, a link 40 is provided, which is connected at one end to the rock lever 27, and is supported at its opposite end by a pin 41 arranged to ride freely in a slot 42 formed in the frame 31. A rod 43 extends from the link 40 to connect with a pawl lever 44 pivoted to the carriage 26 and carrying at its opposite end a weighted pawl 45 arranged to engage a ratchet 46, which is fixed to a staff 47, the latter carrying a pinion 48 in mesh with a gear 50, which forms one of the heads for the spool 24. The rise and fall of the arm 34 in following the contour of the cam cause the link 40 to actuate the rod 43, and thus, through the pawl 45, impart a step by step movement to the ratchet 46 and thereby intermittently feed the ribbon 13.

In Fig. 7 one form of recording system in which the invention may be embodied is diagrammatically outlined, and a plurality of thermocouples 51 are shown in conjunction with a suitable switching mechanism 52, by means of which the thermocouples may be brought successively into the electrical control circuit 53 of the movable element 54 which actuates the pointer 12 of the recording instrument. The switch 52 is to be understood as a conventional type of selective switch, and as shown indicates that thermocouple No. 1 is connected to the recording instrument for the purpose of making one indication upon the chart and one of the identifying color characteristics for that thermocouple. In this way, with the parts working in proper time relation, the thermocouples are brought into operative relation with the recording instrument one at a time, and the cam 32 for varying the characteristics moves through a predetermined arc after each connection of a thermocouple.

From the foregoing, it will be apparent that a complete unitary identification system for multiple recording instruments has been provided, whereby as many recorded indications may be made upon the chart or record strip as there are thermocouples or other devices used with the recorder, and each of these recorded indications has a predetermined color characteristic by which it is possible to at once identify the thermocouple or other device associated with the recording instrument at the time that particular record indication is made. It will thus be evident that a single recording instrument can be used for recording the temperatures of a plurality of furnaces, and through the identification of the characteristics on the chart the temperature record of each furnace is readily distinguishable from the temperature record of all of the other recorded indications.

Although only a single form is shown in which this invention may be embodied, it is to be understood that the invention is not limited to any specific construction, but might be applied in various forms without departing from the spirit of the invention or the scope of the appended claims.

Having thus described my invention, I claim:

1. In a recording instrument, the combination of means presenting a record surface, a transfer medium divided into differently colored sections, means to engage said medium to make a record on said surface, and mechanism for adjusting said medium relative to said means to make a distinctive record for each of a plurality of devices greater in number than the number of medium colors, said mechanism adjusting said medium to form certain of said records from combinations of a plurality of colors.

2. In a recording instrument comprising record forming mechanism adjustable to form record marks in different colors, and means operable to successively connect said instrument to different devices for which separate records are to be made, the improvement which consists in provisions for automatically so adjusting said mechanism in timed relation to the operation of said means that the different record marks constituting the record for one of said devices vary in color in regular order.

3. In a recording instrument comprising a meter adapted to be connected to a plurality of electrical circuits one at a time, a record chart and means for recording on said chart the respective indications of said meter in one or another of a plurality of colors, the improvement which consists in provisions for automatically adjusting said means to make separate color identified records for the different circuits, one at least of which records is composed of record marks alternating in color.

4. In the operation of a multiple recorder utilizing a number of separate colors to make separate color identified records, the improvement which consists in forming one or more of said records of predetermined combinations of said colors whereby the number of color identified records produced may exceed the number of colors utilized.

5. In a multiple recorder of the type comprising a movable pointer, mechanism for intermittently depressing said pointer and means adjustable to bring one or another section of a transfer medium comprising a plurality of differently colored sections into record impressing relation with the pointer when the latter is depressed, the improved means for producing more differently colored records than there are colored sections of said transfer medium comprising mechanical provisions operating in timed relation with said mechanism for adjusting the first mentioned means to form record impressions in recurring series each of which comprises a plurality of successive sections of record indications and each of which sections includes one record impression for each record to be produced and said impression being so colored that the record impressions in successive sections forming a part of any one record are of the same color in the case of some, and different in color from one another in the case of others of the records produced.

6. In a multiple recorder of the type comprising a movable pointer, mechanism for intermittently depressing said pointer and means adjustable to bring one or another section of a transfer medium comprising a plurality of different colored sections into record impressing relation with the pointer when the latter is depressed, the improvement which consists in means operating in timed relation with said mechanism for adjusting the first mentioned means to form record impressions in recurring series each of which comprises more impressions than there are medium section colors and each of which series includes two impressions of one color followed respectively by impressions which differ in color from one another.

Signed at Philadelphia, in the county of Philadelphia, State of Pennsylvania, this 24th day of July, 1923.

GEORGE W. GRISDALE.